(12) United States Patent
Castagno

(10) Patent No.: US 12,400,090 B2
(45) Date of Patent: Aug. 26, 2025

(54) SYSTEM FOR DETECTING AND CLASSIFYING THE HANDLING OF GOODS DISPLAYED IN RETAILS SHOPS

(71) Applicant: Paola Castagno, Turin (IT)

(72) Inventor: Paola Castagno, Turin (IT)

(\*) Notice: Subject to any disclaimer, the term of this patent is extended or adjusted under 35 U.S.C. 154(b) by 0 days.

(21) Appl. No.: 18/558,424

(22) PCT Filed: Apr. 25, 2022

(86) PCT No.: PCT/IT2022/050108
§ 371 (c)(1),
(2) Date: Nov. 1, 2023

(87) PCT Pub. No.: WO2022/234606
PCT Pub. Date: Nov. 10, 2022

(65) Prior Publication Data
US 2024/0232550 A1    Jul. 11, 2024

(30) Foreign Application Priority Data
May 3, 2021    (IT) .................. 102021000011246

(51) Int. Cl.
*G06K 19/07*    (2006.01)
*G06K 7/10*    (2006.01)

(52) U.S. Cl.
CPC ..... *G06K 7/10316* (2013.01); *G06K 19/0723* (2013.01)

(58) Field of Classification Search
CPC .................. G06K 19/0716; G06K 19/0723
(Continued)

(56) References Cited

U.S. PATENT DOCUMENTS

| 11,295,093 B2 | 4/2022 | Rasmussen et al. |
| 2006/0163349 A1* | 7/2006 | Neugebauer ......... G06Q 20/387 235/383 |

(Continued)

FOREIGN PATENT DOCUMENTS

| EP | 2091003 A1 | 8/2009 |
| EP | 3736737 A1 | 11/2020 |
| FR | 3058216 A1 | 5/2018 |

OTHER PUBLICATIONS

International Search Report and Written Opinion for PCT/IT2022/050108 mailed Aug. 26, 2022.

*Primary Examiner* — Toan C Ly
(74) *Attorney, Agent, or Firm* — Perilla Knox & Hildebrandt LLP; Kenneth A. Knox

(57) ABSTRACT

This patent concerns a system for tracking and identifying goods at points of sale. Particularly it concerns a physical system and a method that can be conveniently used to recognize whether the goods displayed at a point of sale have been manipulated and if so identify with good approximation by means of an expert system the possible type of manipulation that has occurred. That system allows, thanks to this evaluation, to activate, where appropriate, management and control procedures appropriate to the identified event. These procedures include, by way of example, actions to combat possible biological contamination of the goods but also to plan regular reordering, re-packaging, cleansing, fragrance or care of the goods displayed at the point of sale. The proposed system obtains these aforementioned objectives through a new identification tag that can be used to detect the possible removal of the goods from its usual point of display in a point of sale through the acquisition and analysis of various significant parameters (distance, duration, environmental conditions, etc.). This usual point (shelf, display, cabinet and the like) being equipped with a reader (Continued)

Figure 1:
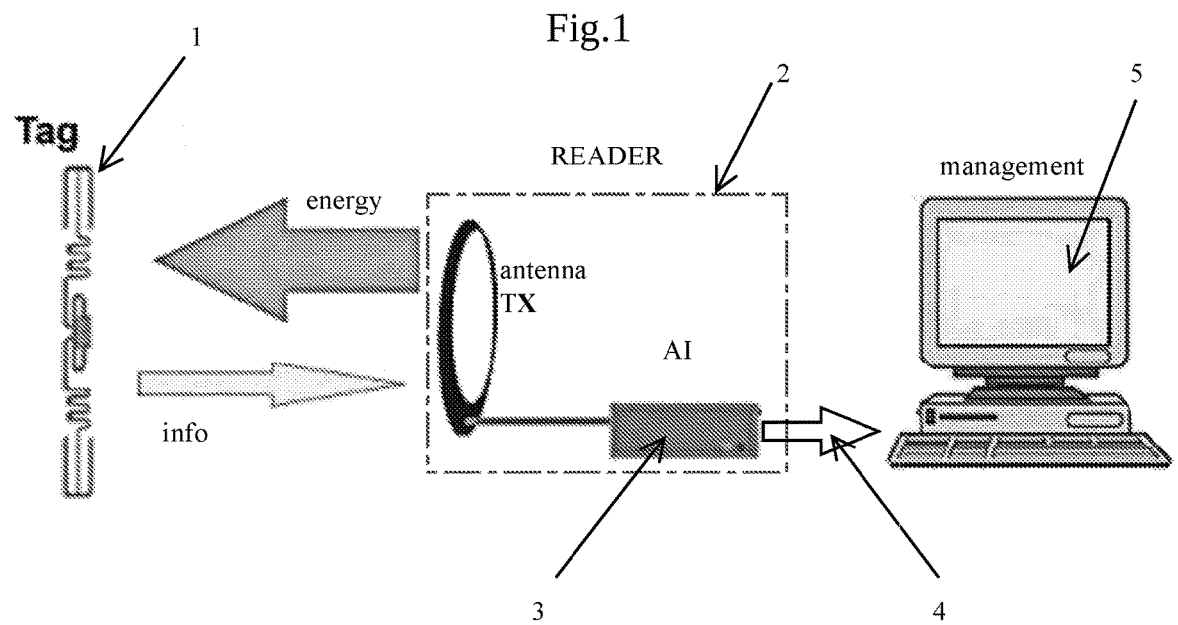

that analyzes the data of the tag and classifies them through an expert system aimed at identifying situations of possible handling of the goods. Said tag not using batteries but being recharged wirelessly by said reader during the normal parking of the goods at the point of exposure. That system of tracing and identifying goods at points of sale by being used to detect and classify the handling of goods normally placed on the exhibition facilities (21), (22) of a point of sale; that classification being obtained through a reader (2) installed on those display structures (21), (22); said reader (2) being equipped with an expert system (3) that processes the data provided by a tag (1) applied on said goods; that tag (1) being provided with a said tag (1) includes an energy harvesting circuit (12) and being used to track the movement of those goods when they move away from that reader (2).

20 Claims, 2 Drawing Sheets

(58) Field of Classification Search
USPC .......................................................... 235/385
See application file for complete search history.

(56) References Cited

U.S. PATENT DOCUMENTS

| | | |
|---|---|---|
| 2015/0304611 A1 | 10/2015 | Nakase et al. |
| 2019/0149725 A1* | 5/2019 | Adato ..................... H04N 1/00 |
| | | 348/158 |

\* cited by examiner

SYSTEM FOR DETECTING AND CLASSIFYING THE HANDLING OF GOODS DISPLAYED IN RETAILS SHOPS

CROSS-REFERENCE TO RELATED APPLICATIONS

This application is a national phase application under 35 U.S.C. § 371 of International Application No. PCT/IT2022/050108 filed Apr. 25, 2022, entitled, "SYSTEM FOR DETECTING AND CLASSIFYING THE HANDLING OF GOODS DISPLAYED IN RETAILS SHOPS," which claims the benefit of and priority to Italian Patent Application No. 102021000011246 filed May 3, 2021, the contents of each of which being incorporated by reference in their entireties herein.

TECHNICAL FIELD

This patent concerns a system for tracking and identifying goods at points of sale. Particularly, it concerns a system that can be conveniently used to recognize whether the goods displayed in a point of sale have been manipulated and, in this case, to discern whether they have been manipulated by customers rather than by sales staff or possibly by third parties (haulers, etc.). This system is particularly convenient for identifying and discerning interactions with the goods according to various levels of importance: from potentially dangerous contacts for any biological contamination to simple reordering, re-packaging or care of the goods displayed in that point of sale.

BACKGROUND ART

For years there have been systems for the identification and traceability of goods used to monitor the position and status of products. For example, in sales field it is important to know the location of items within the point of sale to automate their loading/unloading, to automate sales procedures and also to identify and prevent theft attempts.

Historically, various technological solutions and methods of tracking/controlling goods have been proposed and are still on the market, such as anti-shoplifting systems rather than automatic cashier, procurement or inventory monitoring systems based on these systems. These solutions have more or less evolved over time but are generally based on an identification and tracking device usually applied safely to a product/goods to be tracked; this device typically bearing verifiable and possibly updatable information concerning the goods on display. These devices include identification means such as barcodes, magnetic strips and RFID markers.

Barcodes (first one-dimensional and then two-dimensional) are among the best known among these applications and were among the first to be used to identify and track items. In particular, one-dimensional barcodes are the oldest and most common and are still used to identify items for example in supermarkets. However, both single- and two-dimensional barcode systems have numerous defects and drawbacks: they are often not compatible with each other, must be clearly visible and readable by a scanner and risk detaching or damaging becoming illegible during the life of the goods especially when it comes to goods exposed to manipulation by third parties. It follows that the goods associated with these barcodes need to be moved with extreme care to allow the maintenance of these codes intact and further need to be precisely positioned on display shelves or other to ensure the correct reading of the information. All this making these technologies more preferable for basic and limited uses such as automatic or semi-automatic checkouts, that is, in the presence of operators or customers who manually carry out scanning operations.

Another known method of tracking products is based on magnetic strips bearing pre-programmed coded information; called magnetic strips being typically applied to the outer surface of a product. The information relating to the goods in this case is read without manual intervention but by passing the magnetic stripe through a high-resolution magnetic reader. Unfortunately, even magnetic strips are further prone to damage, and require readers positioned at a very precise and specific distance which can be a management problem in the case of points of sale characterized by heterogeneous products.

Finally, last in order of time but most widespread in stores are the so-called systems based on RFID tags or systems with markers consisting of identification and tracking devices operating on radio frequency.

The RFID technique or RFID tag (referring to the marker that implements said technology) works according to an inductive principle: in an RFID system, a reader generates an electromagnetic field at a predetermined frequency; when an RFID tag, which can usually be classified as read-only or read/write, enters the electromagnetic field generated by the reader a small electric current is formed in the so-called resonant circuit of said RFID tag; said circuit typically including a spiral antenna and a capacitor. This circuit absorbs energy from the magnetic field and provides a limited power and durability supply to the RFID tag, which then modulates the magnetic field to transmit pre-programmed information to the reader. This reader receives, de-modulates and decodes the signal of the RFID tag by obtaining the information on the product associated with it and subsequently sends said data to a host computer for further processing/actions that by way of example may involve warehouse management, invoicing, issuance of receipts, anti-shoplifting alarms etc. To date, RFID technology is dominant worldwide and moreover with excellent performance and reduced costs in the aforementioned contexts.

On the sidelines of the aforementioned passive RFID tags, it should be noted that there are also so-called active RFID, decidedly more advanced and expensive but not very widespread.

This is because these devices require permanent power supply so that they are ill-suited to applications for commercial areas of products that are difficult to connect to the electrical network or equip with batteries, such as goods displayed in the points of sale that are the field of application of the present invention.

From the patent point of view, solutions have been proposed over time that allow you to trace objects using RF systems and in particular the patents are remembered:

US2015304611 [NAKASE KOICHIRO [JP]; HATTORI WATARU [JP], 22 Oct. 2015];
EP3736737 [RASMUSSEN BJÖRN [NL]; KONGARI RAGHAVENDRA [NL]; JOSHI SHANKAR [NL]; PATHAK RAHUL RAVINDRA [NL, 11 Nov. 2021];
FR3058216 [COLLIGNON JEAN-MARC [FR]; QUEMENT ALEXIS [FR]; RMILI BADR [FR]; BARON BRUNO [FR], 4 May 2018];

these patents use tags based on RF systems and employ signal strength detection techniques in order to measure the distance of the branded objects but are limited by the fact of performing a generic and centralized measurement that does not allow to distinguish precisely and individually a plurality of traced elements.

Even a reliable, consolidated and durable technology such as RFID technology is subject to limits and inefficiencies when used outside its traditional areas of identification and tracking of goods or for purposes not strictly related to these areas. In the case of RFID devices, these limits were particularly highlighted during the COVID 19 pandemic event.

In this circumstance, the necessary measures to prevent the spread of the virus have included actions not only concerning the use of personal protective equipment for customers and operators but have become necessary further and repeated sanitization initiatives of the premises and products aimed at containing human contagion.

In the shops and especially in those with a commercial vocation, it was necessary to implement preventive verification systems for potential contamination and implement systematic periodic sanitization actions of the premises, environments, workstations, other areas and, not least those items of the store subject to external manipulations, with particular regard to those untraceable and controllable handling with a good degree of reliability such as the customer interactions with the goods on display. Think, for example, of the case of clothing stores where goods are often moved, lifted, opened, checked in detail or even worn, in the case of clothing or accessories, without there being a rigorous and punctual control by the staff who obviously is unable to constantly monitor all the goods on display. For this type of problem, i.e. recognizing whether the goods displayed in a point of sale have been touched by customers and need action, the systems currently used in the points of sale are totally inadequate. And this is not an occasional limit linked to the pandemic event but a more general problem inherent in the monitoring of objects exposed reasonably and understandably to the contact/manipulation of the public without current identification and tracking technologies allowing to identify such interactions regardless of the severity of the consequences of said contact. In fact, it should be noted that the techniques mentioned in the previous paragraph and massively used in the points of sale and particularly those based on RFID techniques are totally inadequate indeed unusable for this purpose.

It is known that RFID systems acquire a limited amount of energy from the transmitter and through an antenna printed on various materials, once charged, retransmit for a very limited period of time a series of data to the control system or reader used. These characteristics and in particular the reduced power greatly limit the time and distance of transmission (practically an RFID tag is a system that alternately transmits or does not transmit) and consequently the data and the complexity of the operations that can be performed with these devices are also very limited which, being born expressly to operate without power, allow only to transmit in a limited and occasional way a few basic information useful for tracking/identification of a good or a good without being able to intervene in more articulated and long-lasting communication processes. This feature means that this RFID technology is therefore excellent in the presence of punctual control activities, of short duration (spot check) and made at so-called predetermined check points (such as point of sale checkouts, anti-shoplifting scanners, etc.); this technology, on the other hand, is totally inadequate to detect actions such as the handling of customer goods that instead require in addition to the basic identification of the object additional requirements and characteristics including:

- a greater sensitivity range and in any case varied and unpredictable a priori as is the case with RFID scanners; this range having to adapt to the type of goods and the type of manipulations to which they are potentially subjected;
- a signal whose intensity can be used to measure dynamically and with good precision also the distance of a tag applied to a commodity with respect to the reader; this parameter being naturally relevant to help correctly identify the type of handling to which the monitored goods are subjected;
- an energy and operational autonomy that allows to be active and functioning at least for as long as a possible handling of the goods (both expected and unexpected), said time being usually several seconds or even minutes and therefore impossible to cope with the energy/operating autonomy of a traditional passive RFID tag.

The structural and functional limits of the RFID tracking and identification systems currently implemented and the lack of alternative means suitable for establishing or at least estimating with good approximation whether the goods are subjected to manipulations forces, particularly in the case of pandemic events and contaminations but also for a better quality control of the goods exposed to implement burdensome and unnecessary preventive systems such as high-frequency sanitization even if not necessary, unnecessary removal of reorders and tests of goods perhaps intact and intact, preventive suspension of the display of goods (for example 12 hours for clothing if tried) even if these measures are not necessary or if the handling operations are carried out by personnel in an appropriate manner not to compromise the goods.

DISCLOSURE OF THE INVENTION

This patent aims to overcome the critical issues mentioned above by implementing a system capable of recognizing whether the goods displayed in a point of sale have been manipulated, if so, identifying with good approximation and through an expert system what kind of possible manipulation has occurred and, thanks to this evaluation, possibly activating management and control procedures appropriate to the identified event. These procedures include, by way of example, actions to counteract possible biological contamination of the goods but also to plan much more simply regular interventions of reordering, re-packaging, cleansing, fragrance or in any case care of the goods displayed in the store.

Another objective of the proposed system is to create a system that allows through an ad hoc tracking device to overcome the energy and functional limits of common identification and tracking systems based on RFID techniques and widely used in points of sale; this system allows to dynamically detect data relating to the handling of a goods such as, by way of example and not limited to, the distance to which it was brought with respect to its original location and the time during which it was removed and potentially manipulated.

Another objective of the proposed system is to obtain an expert system that allows to analyze the aforementioned information and discern those potentially corresponding to manipulation interventions and classify them as ordinary activities (for example reorganization of salesmen/sales staff or accidental contact or manipulation of customers or other third parties having cause etc. etc.).

Another objective of the proposed system is to obtain a system that, based on the aforementioned evidence, allows to adequately inform the sales staff or whoever for them and possibly intervene also by automatic or semi-automatic means of disinfection but also more simply of cleansing and/or fragrance on the manipulated goods according to the scenarios and needs that may arise.

In an advantageous implementation of the invention, the proposed system obtains the aforementioned objectives through a new identification tag that can be used to detect the possible removal of the goods from its usual point of display in a point of sale through the acquisition and analysis of various significant parameters (distance, duration, environmental conditions, etc.). This usual point (shelf, display, cabinet and the like) being equipped with a reader that provides to receive, process, analyze the data of said identification tag and further interpret/classify through an expert system situations of possible handling of the goods on which said tag is affixed. This reader being used further to recharge during the common shelf rest the identification tag developed since this structurally requires a greater amount of energy than that absorbed and used by common RFID tags. This aspect is crucial because the tag in question is functionally more advanced and complex circuitically to perform operations and calculations much more complex than a common RFID; it also has a much wider range of time and distances of use and, further, is equipped with sensors: all this resulting in greater consumption and therefore the need for a preventive accumulation of energy such as to guarantee the operation of the device when the goods will be subject to tracking or when removed from the pre-established positioning place due to manipulation.

Going into more detail, the system consists of a tag or label made in the form of an RF micro-device (radio frequency). This micro device is equipped with a wireless power supply system and an antenna used primarily with the same purpose as a common RFID, that is, to allow the tag to restructure and re-emit a signal to the reader that "illuminates" it. At the same time, however, said antenna being designed built and sized (shape, size, operating frequencies and characterizing) to meet two further and crucial aspects:

absorb and maximize the energy that the reader transmits to them during charging; this loading phase reasonably corresponding to the time in which the goods are statically positioned on the shelf and subjected to the electromagnetic field of the reader; all this by creating a so-called wireless charging.

maximize the possibility of remote detection of the tag and the information content of the message itself, that is, generate a signal that for shape, power and frequency content can be detected by the reader at greater distances and contain information related not only to a commodity code (or a few other fixed information) but also a series of additional and dynamic information, derived from calculations of the electronics on board tags and/or sensors.

Pursuing these purposes, the tag that is used to track the goods is therefore based on an antenna that optimizes sensitivity at the expense of the instantaneous ability to acquire the charge. As a consequence of this, the proposed tag, loads more slowly than an RFID but acquires much more charge and keeps it as long as it is within the detection range of the reader that as anticipated goes well beyond the range of a classic RFID. Thanks to the greater energy forfeited and the vast reading range, well beyond the physical dimensions of the structures that host the goods, the tag is therefore able to communicate to the reader not only a series of data limited to the identification code and little else as in traditional RFID, but being a process tag (with a microprocessor powered by the accumulator and therefore capable of more complex processing), it is also able to send a whole additional series of data, possibly processed and refined, such as by way of example and not limiting or exclusive, the distance from the reader, acceleration, temperature and humidity). These parameters are detected by means of appropriately integrated sensors.

As for the detection of the distance between tag and reader, which is the other crucial aspect for obtaining the proposed objectives, this is realized through a high sensitivity system for the detection of amplitude of the near-field emitted by the reader. Limiting the transmission power to a minimum, with an appropriate antenna and an ad hoc signal amplification system, combining modulation techniques of the same with diffuse spectrum to raise the SNR, the tag is able to measure with sufficient accuracy the distance from the reader when the same is in a radius from a few centimeters to meters or in the useful range in which an exposed goods are if subject to manipulation by third parties.

This innovative tag therefore gives basic indications of its status when it is stationary in the emission range of the reader, but transmits and continues to transmit information even while the goods to which it is applied are taken and, particularly, while it is moving away from the field or is outside it; this for as long as necessary for the operation of identifying the position, movement and classification of the type of manipulation carried out on the basis of data collected and the measurements made through the tag.

Obviously, the tag can take a form appropriate to the application and product scope in order to allow the appropriate anchoring. From a practical point of view and by way of example and not limited to, the tag can be attached to the product or attached to a support or packaging of a product (for example a hanger if the product is a piece of clothing). Always from the implementation point of view, the reader will consist of a control board with a communication device with the tag and said hardware will be appropriately integrated into the structures of the point of sale reasonably responsible for hosting the goods on display (shelves, showcases, cabinets, displays etc. etc.). Finally, it should be noted how the tag can be equipped with devices and signals to alert, for example, visually users and/or employees of the point of sale that the goods have been subject to handling and further be equipped with on-site intervention systems such as disinfectant capsules rather than flavors/perfumes rather than detergents that can be activated manually or even automatically by the tag on the basis of predefined protocols for the various types of manipulations detected.

BRIEF DESCRIPTION OF THE ATTACHED DRAWINGS

Figure 2:
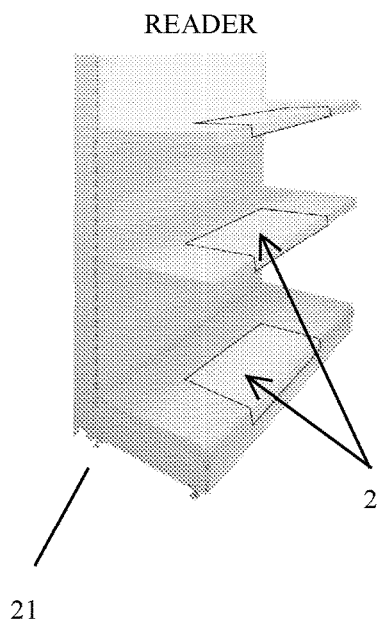
Figure 3:
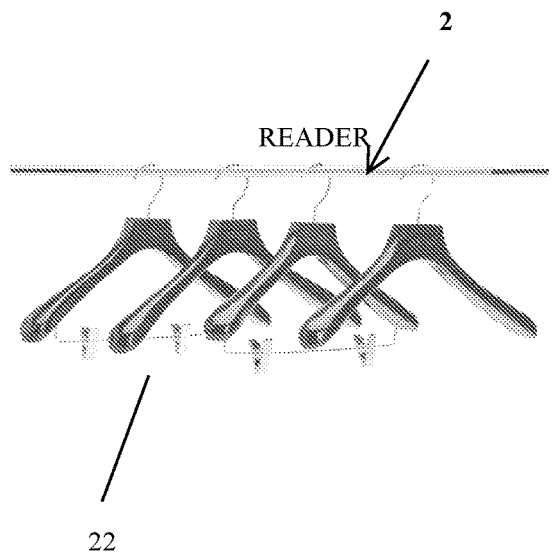
Figure 4:
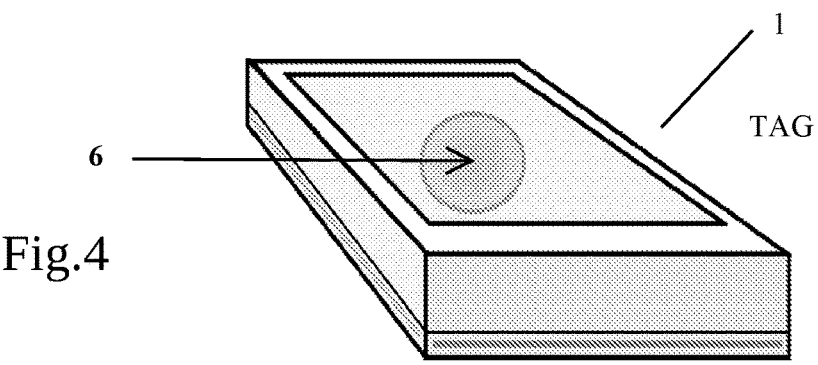
Figure 5:
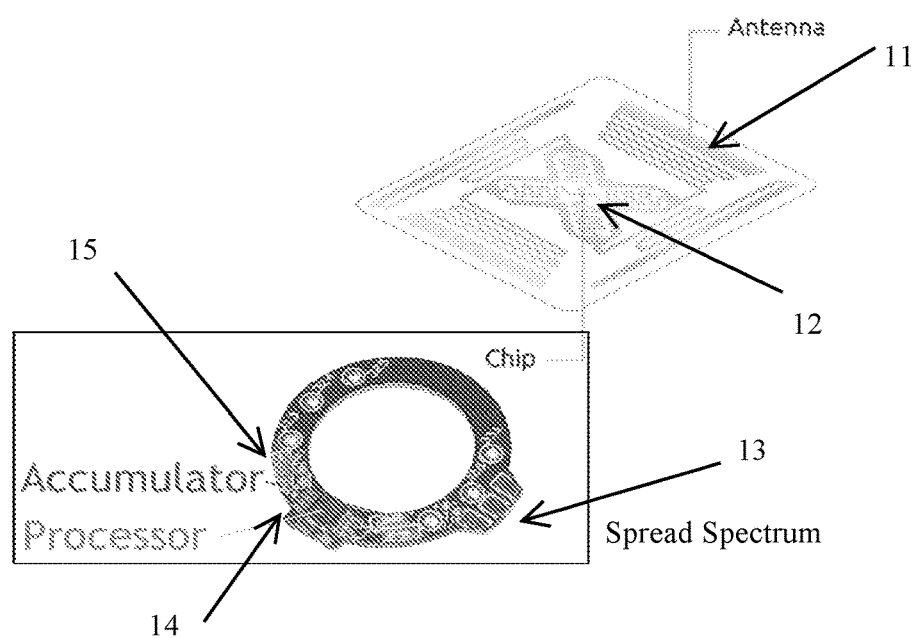
Figure 6:
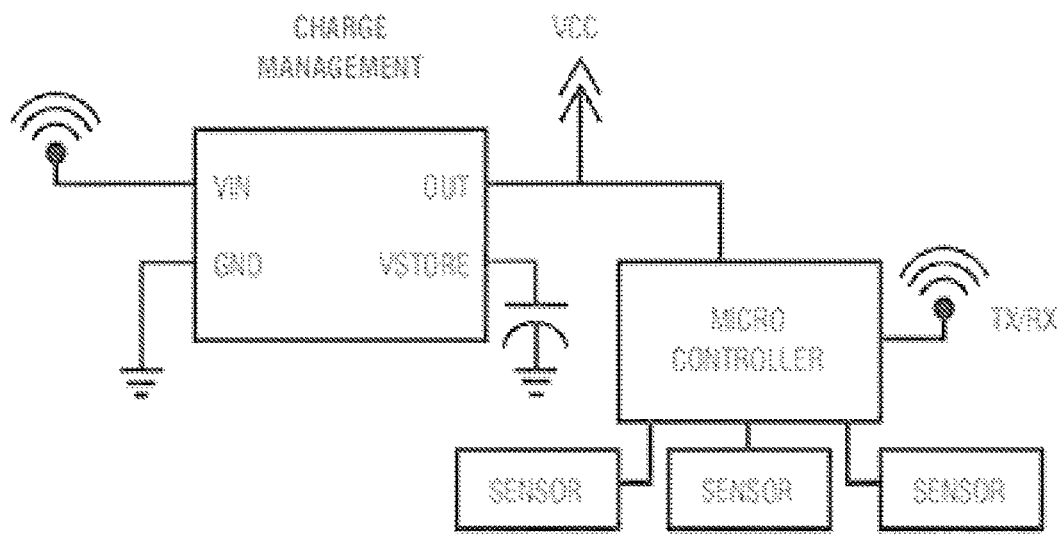

Further characteristics and advantages of the proposed technical solution will be more evident in the following description of a preferred but not exclusive form of realization, represented, by way of example and not limited to, in the 2 tables of drawings attached where:

FIG. 1 illustrates the logical scheme of the system;

FIG. 2 and FIG. 3 schematically illustrate two examples of exhibition structure on which a tag reader can be installed to control the handling of the goods on display;

FIG. 4 schematically illustrates the general structure of a tag according to the proposed invention; and FIG. 5 and FIG. 6 represent the circuit detail of the tag with antenna.

It is specified that the figures attached to this application illustrate only some possible executive forms of the system, to better understand its advantages and characteristics described.

These executive forms are therefore to be understood for illustrative purposes only and not limited to the inventive concept.

BEST MODE FOR CARRYING OUT THE INVENTION

With reference to the attached drawing tables and in particular to FIG. 1, the principle of operation of the proposed system, called system, is briefly represented, including:
- a tag (1) to be applied to the goods and used to identify them, track their position and identify any manipulations;
- a reader (2) to be integrated into the facilities of a point of sale normally used for display of such goods; said reader being used to acquire from said tag (1) information concerning its position and other ancillary information; that information, being used to detect and classify the forms of handling to which those goods have been subjected;
- an expert system (3) integrated into that reader (2); said system being able to identify and classify with artificial intelligence techniques any cases of manipulation. This expert system may be able to predict with biological models the probability of manipulation and support the implementation of appropriate measures corresponding to possible cases;
- a link (4) with the company's IT systems (5) for the possible activation of planned and predefined procedures following the identification and classification proposed for the potential manipulation identified by the expert system (3). These procedures include the typical activities envisaged or prescribed depending on whether the manipulation is attributable to customers or sales staff or prescribed depending on whether the activities detected are of an ordinary or extraordinary nature or that the potential manipulation took place for the purpose of intent etc. etc.

The aforementioned expert system (3), based on algorithms and AI techniques, is able to predict with biological models the probability of handling of the goods using the data provided by the tag (1), called data including at least the time of handling of the goods by the customer, the absolute distance and the variation of distance of the goods from the reader (2). This information includes, where appropriate, additional data/parameters obtained from additional sensors such as gyroscopic, temperature, humidity and additional sensing devices that can be integrated into the system.

The aforementioned AI algorithms and techniques allow on the basis of these data to profile the person who is handling the goods, highlighting for example if it is a customer (possible profile of contamination or interference with the product) in which case the system will provide not only the signal of said event but will integrate this information with other useful data such as contact time, the type of goods tested or not, etc.). Another typical profile detected by the expert system (3) will be that of a salesman (with the possibility of excluding contamination warnings if the salesman follows the directives of the point of sale for ordinary management and the common operations of reordering, rearranging, re-packaging, cleaning or any ordinary disinfection treatments of the goods on display). Once the event has been identified and the type of potential manipulation has been classified with the expert system (3), the system can activate a series of countermeasures and communications and also alternative or cumulative initiatives depending on the cases and needs such as:
1) Local communications and interventions on the tag (1): the tag (1) highlights locally the possible contamination of the product, for example by changing the wording or color, to alert subsequent customers or store managers if which product needs attention and what kind of intervention is suggested. In this case, this request for attention may be automated and carried out by means of at least one of the following signalling devices and/or actuators including:
    - an e-paper display with zero consumption to highlight its status, with a microcircuit that communicates with the reader (2) and is updated with the system logic;
    - a microcircuit that communicates with the reader (2) and a very low consumption LED to turn color according to a predefined system logic (different colors for different signals/interventions to be implemented);
    - a micro circuit that communicates with the reader and operates a mechanical mechanism that activates the local disinfection function (6) such as, but not limited to, a system that pierces a gel capsule by humidifying the solid ozone capsule that sublimates, or simply releasing scented substances or releasing natural substances with detergent rather than anti-bacterial/antiviral action;
2) Remote communication via reader (2): the reader (2) transmits to the management system (5) of the point of sale notices and information relating to the possible manipulation identified and classified. The management system (5) detects these contents and plans the necessary corrective actions. In this case, the reader (2) itself or the stands/exhibitor/container of the goods may be equipped with additional visual or acoustic signaling devices of the possible manipulation including the type of the same and the interventions envisaged for that specific context;
3) Automated communication/on request: the management system (5) or directly the individual reader (2) activate automated procedures and interventions in the local area such as, but not limited to, a local disinfection of the goods that are in a state of possible contamination, for example by remotely activating the disinfection systems on the individual tags (1), for example in one of the ways described in point 1 or additional and alternative disinfection systems at stand level, shelf or display etc.

With reference to the attached drawings and particularly to FIG. 2 and FIG. 3 are represented two possible realizations of the aforementioned reader (2), called reader being by way of example placed on the shelves of a shelf (21) or exhibitor (as for example in FIG. 2), or on a coat rack (22), as for example in FIG. 3, or wherever the goods are placed in the point of sale—showcases, wardrobes etc. Said reader (2) being able to automatically read the presence of a new tag (1) when the corresponding goods are placed, to catalog it and to detect every time said tag (1), and consequently the associated goods, moves away from its range of action: for example when a customer picks up the product to evaluate it. Said reader (2) being further able to detect through the information received from the tag (1) when the goods are stored and also assess whether the customer places the product in its original location or in contiguous or even different locations. The reader (2) then acquires data from the tags (1) associated with the goods and detects the real-time distance of the tag (1) from the reader (2), the various parameters, the timing of the movements and processes and processes and processes these data through the aforementioned expert system (3) which, thanks to AI techniques, updates a probability index of manipulation and/or contamination. When said probability index exceeds a known threshold, it is assumed that the product has been potentially manipulated or even contaminated by the customer and needs attention. The expert system (3) of AI is designed in such a way as to distinguish behavioral patterns, that is, it allows to detect, identify and distinguish cases of manipulation by the clerks or in any case by duly authorized persons, making them distinguishable from the occasional contacts of patrons.

With reference to the attached drawings and particularly to FIG. 5 and FIG. 6, the circuit components of the tag (1) are represented in more detail, whose structure is divided into five elements:

1) an antenna (11) designed to receive, transmit and retrieve energy;
2) an energy harvesting chip (12) that communicates with the reader (2) and exploits the emitted field to accumulate energy;
3) a signal amplifier (13) or amplitude meter (13) of the field emitted by the player (2) with diffuse spectrum logic (Spread Spectrum, SS) used to increase the SNR (said component being possibly and without prejudice integrable in the previous chip (12);
4) a microprocessor (14) that implements the tag management program (1) (also this being without prejudice possibly integrated into the previous chip (12));
5) an accumulator (15)/current tank used to store the charge; said charge allowing the tag (1) to operate and communicate remotely even when it is no longer near the reader (2).

With reference to the above points, the following further considerations and design recommendations should be noted:

1) The antenna (11) will be designed and optimized to comply with the constraints of each application such as the material support chosen for the tag (1), the shape and size of the tag (1) and additional structure constraints; however, this realization will be carried out following very stringent and particular constraints: said antenna (11) must not optimize the frequency response efficiency but be highly sensitive in reception in a wide frequency band to obtain a linear response with the amplitude of an extremely weak signal from which it requires the characterization of a multi-physical simulation system;
2) the energy harvesting chip (12) representing the functional core of the system must recover energy from the RF fields incident on the antenna (11), whatever they may be, in order to recover current and charge the aforementioned accumulator (15). This chip (12) can be commercial or alternatively made directly on silicon to increase performance and obtain lower consumption and current loss. In the case, the system must include an adequate analog air conditioning network that can guarantee the necessary consumption and very low dispersions;
3) the signal amplifier (13) which is the key component for obtaining the distance value must respond to the need for extreme efficiency, very low noise, very low consumption;
4) the microprocessor 14 (as mentioned possibly insertable in the silicon project referred to in point 2), implements the tag management logic (1) and guarantees the very low consumption required by the system as a whole. It must have an extremely low consumption and almost zero leakage current values;
5) the accumulator (15) stores the current required for the operation of the system and must ensure a full-fledged leakage. This conflicts with the need for large capacity (which normally drives up the dispersion value).

INDUSTRIAL APPLICABILITY

The advantages of the proposed invention are many and evident both in terms of reliability and quality. The fact that the tag (1) is not powered by a battery, but by a power acquisition system (it recharges over time when it is in the field of the reader and remains alive and in transmission for as long as necessary for the required task when it is outside the field of the reader). So it does not present problems of battery disposal and is virtually eternal.

Another great advantage of the proposed system is the ability to measure with sufficient accuracy the distance of the tag (1) from the reader (2) in a radius of a few centimeters to meters. This surprising result allows to have an accurate information of the distance of the goods that is reasonably the most important and provides the keystone to perform evaluations albeit qualitative on how the goods may have been manipulated, hypothesize for what purposes and reasonably allow to classify the type of activity carried out and any actions to be taken.

While the invention is susceptible to various modifications and alternative constructions, some preferred embodiments were shown in the drawings and described in detail.

It must be understood, however, that there is no intention to limit the invention to the specific form of realization illustrated, but, on the contrary, it intends to cover all modifications, alternative constructions, and equivalents that fall within the scope of the invention as defined in the attached claims.

The use of "e.g.", "etc.", "or" means non-exclusive alternatives without limitation unless otherwise indicated.

The use of "includes" means "includes, but is not limited to" unless otherwise indicated.

In particular, the invention can be made with technical equivalents, with materials or supplementary devices suitable for the purpose and scope of application.

Conformation and sizing of the constituent parts and the products made may vary in a suitable way, but consistent with the proposed solution. By way of example and not limited to, it should be noted that the geometric shapes of the parties involved may be varied and, further the specific shape and some functionalities of the system: the general setting can in fact be revisited without leaving the scope of the claimed model depending on the structure and size of the point of sale and the goods tracked and subjected to control for any manipulations.

In any case, the necessary changes to the system and the underlying systems, including adjustments and sizing appropriate to the individual installation, will be deductible by a properly trained technician of the branch and without leaving the scope of protection of the claimed patent.

For example, the reader (2) may process and provide transversal information that can be further used for marketing, such as but not limited to:
- the identification of the most touched and observed goods;
- how to handle a garment (duration and type of interaction to understand the customer's satisfaction and relative interest);
- average time of manipulation of a certain garment.

Further the system can be adapted and possibly expanded to provide further and additional services and further equipped with systems and accessories to integrate its operation and increase the potential and areas of use.

For example, the tag (1) may include as an alternative to the disinfection system (6) illustrated in FIG. 4 a capsule containing gel and an ovoid that breaks down by pressure or automatically to emit natural scented substances and aromas. These interventions can be activated by the customer, by the sales staff or by the management of the point of sale to free, for example, aromatic molecules or a particular perfume (for example associated with the brand of the product). Finally, the tag (1) can also accommodate a filling system or replacement of the aromatic part or disinfectant.

The invention claimed is:

1. A system for detecting and classifying a handling of goods, comprising:
a display stand and holder configured to retain goods for display in a retail setting;
a reader provided with an expert system, the reader being configured to be installed on the display stand and holder, the expert system configured to process data provided by a tag attached to individual ones of the goods, the tag being used to track the movement of the goods as they are moved away from the reader;
wherein the tag comprises an energy harvesting circuit connected to an antenna and an accumulator, the accumulator being recharged wirelessly by the reader when the goods are positioned on the display stands and holders, the accumulator being used to power a field strength meter and a microprocessor, the field strength meter being used to detect a distance between the tag and the display stand and holder by measuring a power of a signal received by the reader;
wherein the microprocessor is configured to send data gathered from the tag to the reader via the antenna, the data comprising: an identifier of the tag; a distance between the tag and the reader; and a duration of a manipulation; and
wherein the tag or the reader further comprises a perfuming or disinfection system, the perfuming or disinfection system being activated by the expert system depending on a type of the manipulation as detected and as classified.

2. The system for detecting and classifying the handling of goods according to the claim 1, wherein the tag further comprises at least one of: an accelerometer, a gyroscope, a temperature sensor, and a humidity sensor, wherein data associated therewith being transmitted to the expert system.

3. The system for detecting and classifying the handling of the goods according to claim 1, wherein the tag further comprises a visual or sound signaling system, the visual or sound signaling system being activated by the expert system depending on a type of the manipulation as detected and classified.

4. The system for detecting and classifying the handling of goods according to claim 1, wherein the reader further comprises a visual or sound signaling system, the visual or sound signaling system being activated by the expert system depending on a type of the manipulation as detected and classified.

5. The system for detecting and classifying the handling of goods according to the claim 1, wherein the reader is configured to send a report to the computer system, the report comprising at least one of: the identifier of a most frequently-manipulated tag; a most frequent type of manipulation detected for the tag; and an average time of manipulation detected for the tag.

6. A system for detecting and classifying a handling of goods, comprising:
a display stand and holder configured to retain goods for display in a retail setting;
a reader provided with an expert system, the reader being configured to be installed on the display stand and holder, the expert system configured to process data provided by a tag attached to individual ones of the goods, the tag being used to track the movement of the goods as they are moved away from the reader;
wherein the tag comprises an energy harvesting circuit connected to an antenna and an accumulator, the accumulator being recharged wirelessly by the reader when the goods are positioned on the display stands and holders, the accumulator being used to power a field strength meter and a microprocessor, the field strength meter being used to detect a distance between the tag and the display stand and holder by measuring a power of a signal received by the reader;
wherein the microprocessor is configured to send data gathered from the tag to the reader via the antenna, the data comprising: an identifier of the tag; a distance between the tag and the reader; and a duration of a manipulation; and
wherein the expert system is configured to process the data provided by the tag and classify a type of the manipulation using at least one artificial intelligence routine as trained based on a biological model data.

7. The system for detecting and classifying the handling of goods according to claim 6, wherein classifying the type of the manipulation comprises performing at least one of the following predictions: a authorized or unauthorized manipulation; a manipulation of customers or point of sale staff; a manipulation at risk or not at risk of contamination; an intentional manipulation; an accidental manipulation; and a manipulation that requires rearrangement or repositioning of the goods.

8. The system for detecting and classifying the handling of goods according to the claim 7, wherein the reader comprises a connection with a computer system to transmit results of the classification with the data gathered from the tag.

9. The system for detecting and classifying the handling of goods according to the claim 6, wherein the reader comprises a connection with a computer system to transmit results of the classification with the data gathered from the tag.

10. The system for detecting and classifying the handling of goods according to the claim 9, wherein the expert system is configured to send a command to the tag and to the computer system, the command comprising at least one of: an activation of emergency light signals; an activation of emergency sound signals; an activation of a disinfection system; and an activation of a perfuming system.

11. A method for detecting and classifying a handling of goods, comprising:

retaining goods for display in a retail setting using a display stand and holder;

installing a reader, provided with an expert system, on the display stand and holder;

attaching a tag to individual ones of the goods, the tag comprising: an energy harvesting circuit connected to an antenna and an accumulator; a field strength meter; and a microprocessor;

wirelessly recharging the accumulator by the reader when the goods are positioned on the display stand and holder;

using the accumulator to power the field strength meter and the microprocessor;

measuring, by the field strength meter, a power of a signal received by the reader to detect a distance between the tag and the display stand and holder;

gathering, by the microprocessor, data from the tag, the data comprising: an identifier of the tag; a distance between the tag and the reader; and a duration of a manipulation;

sending the data to the reader via the antenna;

processing, by the expert system, the data provided by the tag; and classifying, by the expert system, a type of the manipulation using at least one artificial intelligence routine trained based on biological model data.

12. The method for detecting and classifying the handling of goods according to claim 11, wherein classifying the type of the manipulation comprises predicting at least one of:

an authorized or unauthorized manipulation; a manipulation of customers or point of sale staff, a manipulation at risk or not at risk of contamination; an intentional manipulation; an accidental manipulation; and a manipulation that requires rearrangement or repositioning of the goods.

13. The method for detecting and classifying the handling of goods according to the claim 11, wherein the reader comprises a connection with a computer system to transmit results of the classification with the data gathered from the tag.

14. The method for detecting and classifying the handling of goods according to the claim 13, wherein the reader comprises a connection with a computer system to transmit results of the classification with the data gathered from the tag.

15. The method for detecting and classifying the handling of goods according to the claim 11, wherein the expert system is configured to send a command to the tag and to the computer system, the command causing at least one of: an activation of emergency light signals;

an activation of emergency sound signals; an activation of a disinfection system; and an activation of a perfuming system.

16. The method for detecting and classifying the handling of goods according to the claim 13, sending, by the reader, a report to the computer system, the report comprising at least one of: the identifier of a most frequently-manipulated tag; a most frequent type of manipulation detected for the tag; and an average time of manipulation detected for the tag.

17. The method for detecting and classifying the handling of goods according to claim 11, wherein the tag further comprises at least one of: an accelerometer, a gyroscope, a temperature sensor, and a humidity sensor, and wherein the method further comprises transmitting data associated with the at least one sensor to the expert system.

18. The method for detecting and classifying the handling of goods according to claim 11, further comprising activating, by the expert system, a visual or sound signaling system on the tag depending on the type of the manipulation as detected and classified.

19. The method for detecting and classifying the handling of goods according to claim 11, further comprising activating, by the expert system, a visual or sound signaling system on the reader depending on the type of the manipulation as detected and classified.

20. The method for detecting and classifying the handling of goods according to claim 11, wherein training the at least one artificial intelligence routine comprises using biological model data to predict probabilities of contamination based on different types and durations of manipulations.

* * * * *